W. R. LINDELSEE.
VALVE.
APPLICATION FILED MAY 1, 1913.
1,117,508.
Patented Nov. 17, 1914.
Fig. 1.
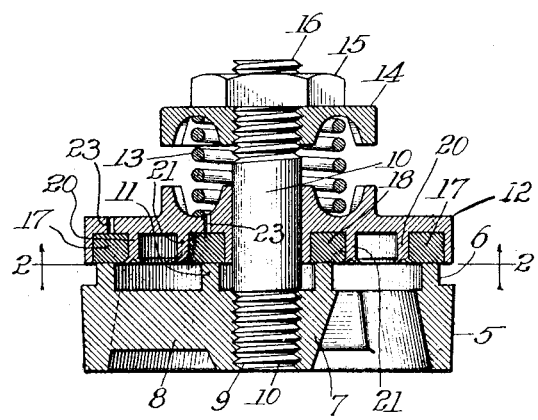
Fig. 2.
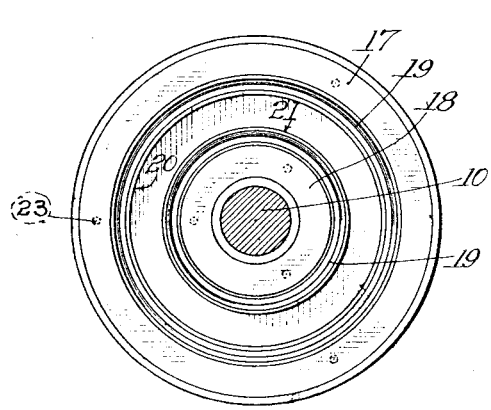
Fig. 3.
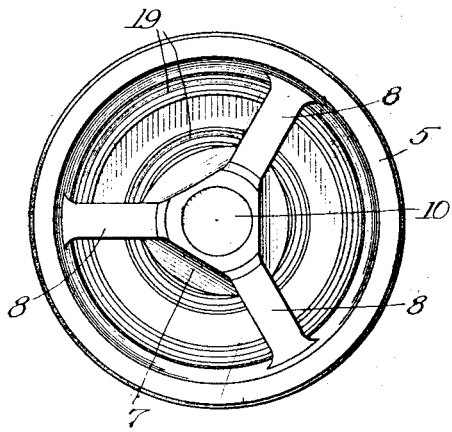
Fig. 5.
Fig. 4.
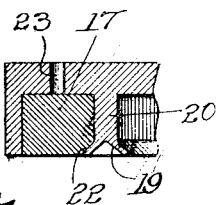
Witnesses:
Robert H. Weir
Arthur W. Carlson
Inventor:
William B. Lindelsee

UNITED STATES PATENT OFFICE.

WILLIAM R. LINDELSEE, OF CHICAGO, ILLINOIS, ASSIGNOR TO FREDERICK Y. NICHOLS, OF CHICAGO, ILLINOIS.

VALVE.

1,117,508.  Specification of Letters Patent.  Patented Nov. 17, 1914.

Application filed May 1, 1913. Serial No. 764,756.

*To all whom it may concern:*

Be it known that I, WILLIAM R. LINDELSEE, a citizen of the United States, residing at Chicago, in the county of Cook and State of Illinois, have invented certain new and useful Improvements in Valves, of which the following is a specification.

My invention relates to improvements in valves of that class that have reciprocatable movement upon a central or axial stud or stem and consists in making the part or packing rings of the valve which come into contact with the valve seat separable from the metallic skeleton or frame of the valve and of such form that the ring or rings thereof which provide the seating faces may be secured within the skeleton by the simple expedient of deforming one of the boundary walls surrounding said rings, so as to produce a small fin to slightly overlie the path taken by the ring when it is being inserted in place.

The salient object of my invention is to provide a secure fastening means for an insertible joint-making ring, having a rectangular cross section, by the provision of an integral part of the valve frame or skeleton adapted to be moved into place in the path of the ring after the insertion thereof.

The structural features of my invention by means of which these objects are attained, will be made clear by a consideration of the following description when taken in conjunction with the accompanying drawing, wherein—

Figure 1 is a central vertical section of my improved valve; Fig. 2 is a section taken on line 2—2 of Fig. 1; Fig. 3 is a view looking at the bottom of the structure; Fig. 4 is an enlarged fragmentary sectional view of a part of the valve frame, showing the valve packing rings inserted before the fastening means has been applied; and Fig. 5 is a similar view showing the parts after the fastening means have been applied.

In all the views the same reference characters are employed to indicate similar parts.

A valve seat portion 5 is provided with an annular projecting valve seat 6 with a central hub 7 to which it is connected by means of arms 8. The central hub 7 is screw threaded, as at 9, for accommodation of a centrally disposed stud 10. Another valve seat 11 similar to, but smaller in diameter than the valve seat 6 surrounds the stud 10. A reciprocatable valve frame or skeleton 12 surrounds the stud 10 and is held in closed position by means of a spring 13 that is held between the upper surface of the skeleton 12 and a nut 14. A stop nut 15 is placed upon the upper screw threaded end 16 of the stud 10 to hold the parts in the required position. When the valve frame 12 is lifted the spring 13 automatically causes the return of the valve to its normal position.

As so far described the structure is similar to valves in common use.

The annular packing rings 17 and 18 are insertible in annular grooves provided in the frame or skeleton 12 and are intended for coöperation with the valve seats 6 and 11, respectively, of the part 5. These rings are preferably made of some yielding material similar to vulcanized rubber or the like, for the purpose of insuring positive seals upon the surfaces provided for this purpose in the part 5. After the rings 17 and 18 have been placed in position in the skeleton or frame 12, an annular groove, such as groove 19, is turned in one of the walls, such as walls 20 and 21 which partially encompass the packing rings 17 and 18 respectively, and then a portion of said walls constituting a small annular fin is laterally deflected into the path of the respective rings, as clearly shown at 22 in Fig. 5, thereby to positively retain the rings in their respective annular recesses and prevent their displacement or removal. The grooves 19 may be made within the walls before or after the packing rings have been inserted in the respective annular recesses, and in order to deflect the portion 22 of the respective walls, it is only necessary to rotate the frame 12 at a high velocity and place a tool at the entrance of the grooves 19 and when a light pressure is applied to the tool, the deflection of the wall portion to provide a slight fin will be effected as stated. The part or frame 12 is preferably made of brass which is of such a character as to be easily manipulated in the manner described.

In deflecting a portion of the walls 20 and 21 it is only necessary to turn over a slight fin to overlie the proximate outer edge of the packing ring. The extent to which the wall is shown deflected is considerably exaggerated in the drawings in order to clearly illustrate my meaning, but in practice, the fin that is sufficient to retain the rings in place, is very much smaller than shown. In fact the retaining fin is so small that when it becomes desirable to remove one of the packing rings it, the fin, may be entirely removed or turned back and after a new packing ring has been inserted, the fin may be returned or there is sufficient stock left of which to provide another similar holding fin.

The packing rings may be easily removed after the fins 22 have been turned back by tapping the rings by insertion of a small tool through the perforations 23.

While I have herein shown a single embodiment of my invention for the purpose of clear disclosure, it is evident that changes may be made within the scope of the appending claim, without departing from the spirit of my invention.

What I claim is:

A valve frame having an annular recess for receiving a packing ring; a packing ring therein, and an annular fin turned over one of the free edges of said ring from the salient edge of an adjoining wall substantially parallel with said ring.

In testimony whereof I hereunto set my hand in the presence of two witnesses.

WILLIAM R. LINDELSEE.

In the presence of—
 FORÉE BAIN,
 MARY F. ALLEN.